Dec. 1, 1970  W. S. CARTER  3,543,569
GUY ANCHOR TESTING DEVICE
Filed Oct. 16, 1968  4 Sheets-Sheet 1

INVENTOR.
WILLIAM S. CARTER
BY Maybee & Legris
ATTORNEYS

Dec. 1, 1970     W. S. CARTER     3,543,569
GUY ANCHOR TESTING DEVICE
Filed Oct. 16, 1968     4 Sheets-Sheet 2

INVENTOR.
WILLIAM S. CARTER
BY Maybee & Legris
ATTORNEYS

Dec. 1, 1970   W. S. CARTER   3,543,569
GUY ANCHOR TESTING DEVICE
Filed Oct. 16, 1968   4 Sheets-Sheet 3
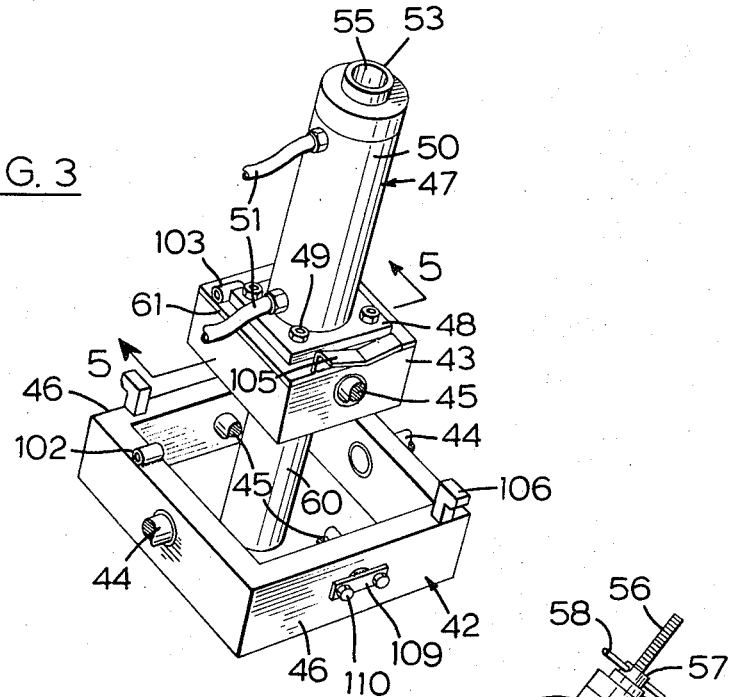
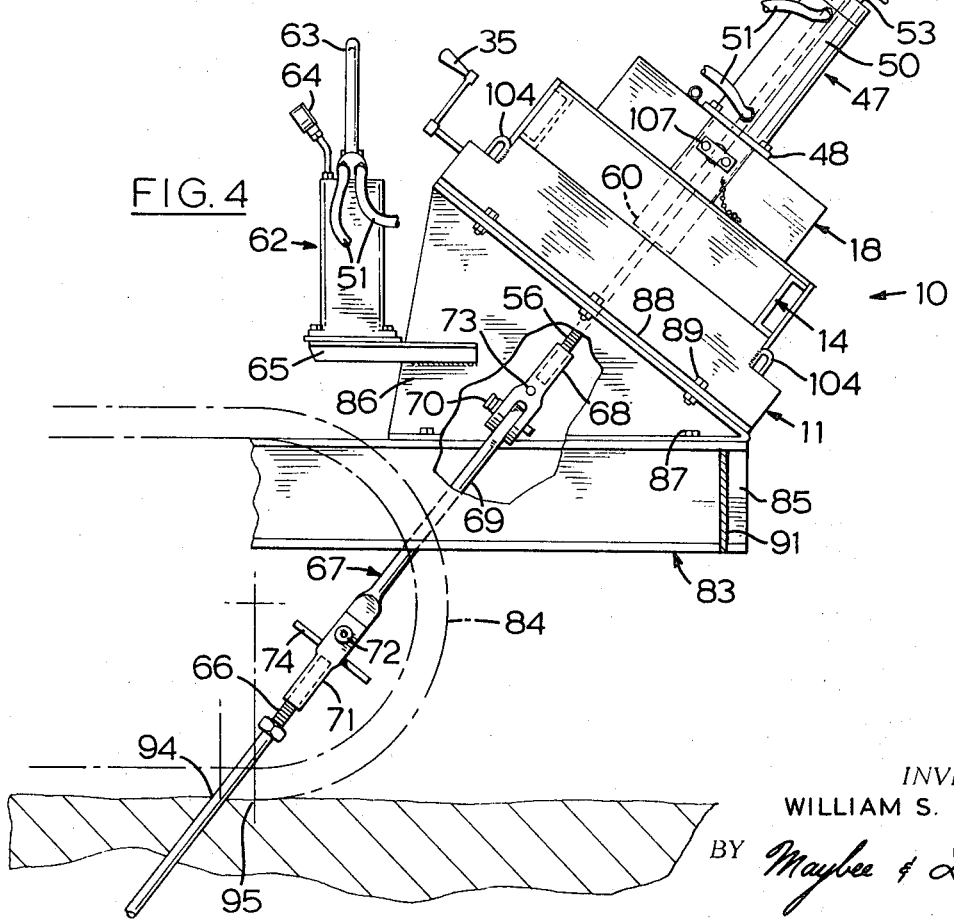
INVENTOR.
WILLIAM S. CARTER
BY Maybee & Legris
ATTORNEYS Dec. 1, 1970     W. S. CARTER     3,543,569

GUY ANCHOR TESTING DEVICE

Filed Oct. 16, 1968     4 Sheets-Sheet 4

*INVENTOR.*
WILLIAM S. CARTER

BY *Maybee & Legris*

ATTORNEYS

_United States Patent Office_

3,543,569
Patented Dec. 1, 1970

---

3,543,569
GUY ANCHOR TESTING DEVICE
William S. Carter, 49 Sagebrush Lane,
Toronto, Ontario, Canada
Filed Oct. 16, 1968, Ser. No. 767,966
Int. Cl. G01n 3/10
U.S. Cl. 73—95          6 Claims

ABSTRACT OF THE DISCLOSURE

A testing device for guy anchors having a base member and two sliding frame members sliding at right angles to each other mounted on top of the base member. Another frame member is pivotally mounted inside the top sliding frame member and a support member is mounted pivotally within this last frame member. An hydraulically operated pulling device having a calibrated measuring device attached thereto is mounted in the support member for connection to a guy anchor to be tested.

BACKGROUND OF THE INVENTION

In the installation of certain bridge structures and large supporting towers for power lines it is necessary to use guy wires as part of the support structure and these guy wires must, of course, be anchored into the ground. In many such installations, and this is particularly true of support towers for power lines, anchoring of guy wires is carried out under very difficult conditions and on very rough and difficultly accessible terrain. In any case it is necessary to anchor the guy wires and the guy anchors must be tested to insure that there is proper holding strength in the anchors to support the tower structures.

The advent of exceedingly high voltage power lines has necessitated larger and larger support towers which require guy anchors having greater and greater holding strength. One of the most serious problems which has arisen as a result of the increasingly larger tower structuers is the need of fast and efficient testing devices for the guy anchors which can exert the necessary high pulling forces of up to 100,000 pounds, and which can be rapidly moved from one location to another over all kinds of difficult terrain. Not only would it be advisable to have a readily portable device but also such a device should be adapted to operate in all types of terrain, with a minimum number of interruptions due to shifting of or sliding on the ground on which the test machine is located.

A number of test devices for anchor members have been developed in the prior art. In United States Pat. No. 2,835,128 a pulling device for testing the anchoring strength of bolts and the like embedded in anchoring materials is disclosed. This particular device is, however, quite small and tests only normally to the anchoring surface. It would be quite useless for testing guy anchers for tower and other supporting structures. United States Pats. Nos. 1,055,790, 3,329,401 and 3,355,146 disclose various devices for pulling and actually removing objects, such as posts, stuck drill rods and drill pipes, from materials in which these objects are held or embedded. None of these patents discloses a device for actually testing the holding strength of guy anchors located in various types of ground.

A testing device for guy anchors has now been discovered which is exceedingly mobile, which can test up to very high holding strengths, which can be adapted to test guy anchors fixed vertically or at various angles and which can be easily controlled to compensate for shifting of and sliding on the ground on which the test is being made while substantially eliminating serious interruptions of a test or complete relocation of the test rig.

SUMMARY

The invention relates to a testing device for guy anchors having a base frame member, a lower sliding frame member slidably mounted on the base frame member and an upper sliding frame member mounted to slide on the lower frame member but at right angles thereto. A control mechanism is located on the base frame member which is connected to and controls the movement of the lower sliding frame member and another control mechanism is located on the lower sliding frame member which is connected to and controls the movement of the upper sliding frame member. A pivotal frame member is pivotally mounted within the upper sliding frame member and a supporting table member is pivotally mounted within the pivoted frame -member, pivoting on an axis at right angles to the pivoting axis of the pipotal frame member. Mounted on the table member is an hydraulically operated pulling device which has a cavity through its longitudinal center containing a rod member to be pulled. The pulling device has power means attached thereto and a holding and centering member thereon for gripping and pulling the rod member. The power means has a measuring device thereon calibrated to indicate the pulling force being exerted on the rod member.

It is an object of the present invention to provide a testing device for guy anchors capable of exerting very high pulling forces thereon which not only is of very rugged construction but also is very mobile and maneuverable A further object of the invention is to provide a novel guy anchor test rig which is easily moved from one location to another and which is capable of testing guy anchors located in a vertical attitude or at various angles while being easily adjusted for movement and slippage of the rig while a test is being carried out.

Other objects and advantages of the invention will be apparent from the description following taken in conjunction with the accompanying drawings.

BRIEF DESCRIPTION OF THE DRAWINGS

FIG. 3 depicts an exploded, perspective view of a pivoting frame member and a pivoting table member of the device shown in FIG. 1;

FIG. 4 is a view in side elevation, partially broken away, of the testing device of FIG. 1 shown mounted on a vehicle and connected to a guy anchor to be tested;

DESCRIPTION OF THE PREFERRED EMBODIMENTS

Figure 1:
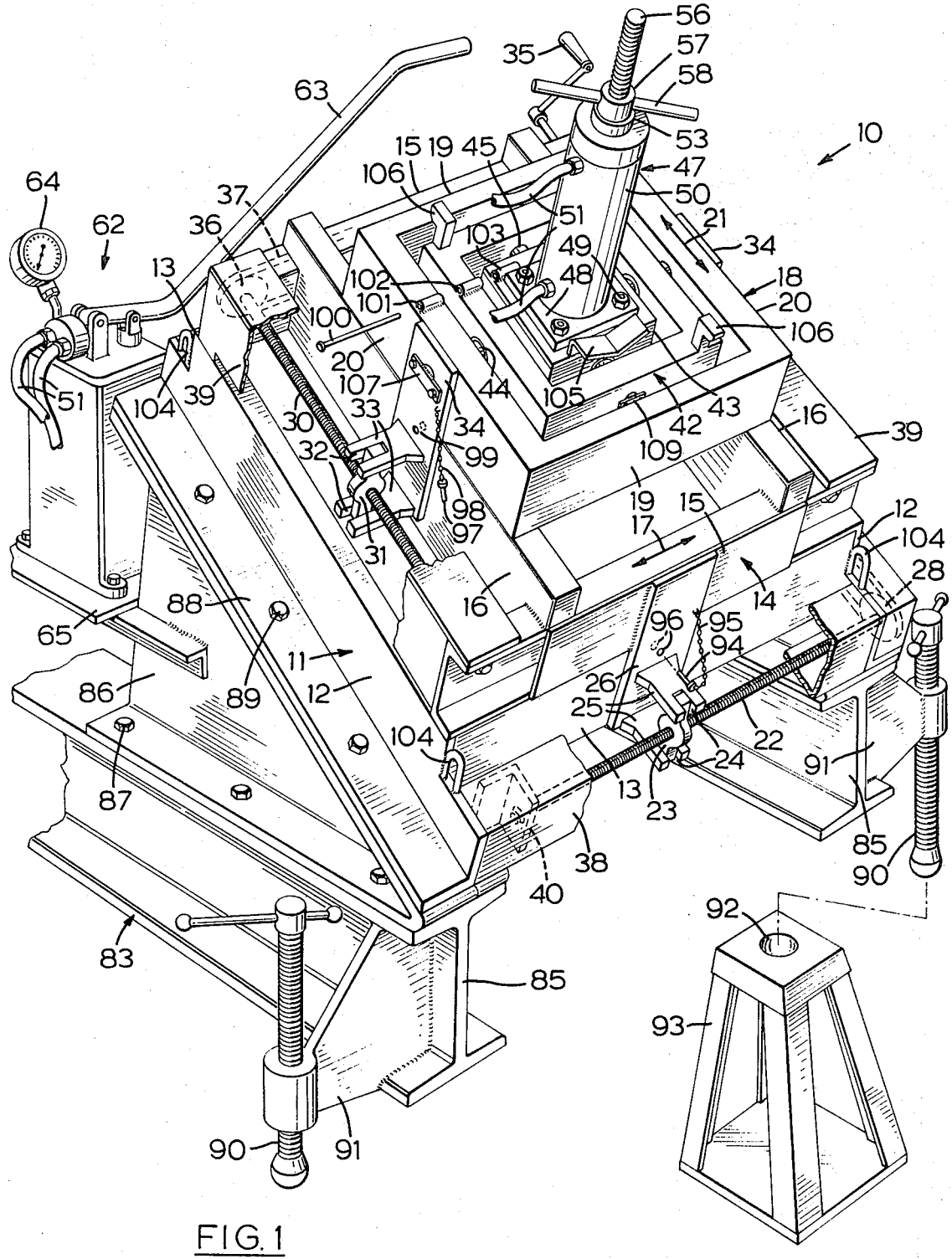
FIG. 1 is a perspective view, partially broke away, of a complete testing device embodying the invention.

Referring to the drawings and in particular to FIG. 1, which is a perspective view of a guy anchor testing device embodying the invention, test rig 10 is seen to have an integral, rectangular first base frame member 11 with pairs of opposing sides 12, 13. A second lower sliding frame member 14 is slidably mounted and superposed on the base frame member 11. The frame member 14 has pairs of opposing sides 15, 16 and is seen to reciprocally slide on the top of the base member 11 in the direction of arrows 17. A third upper sliding frame member 18 with pairs of opposing sides 19, 20 is slidably mounted and superposed on the second frame member 14 and is seen to reciprocally slide on the top of the frame member 14 in the direction of arrows 21.

Figure 2:
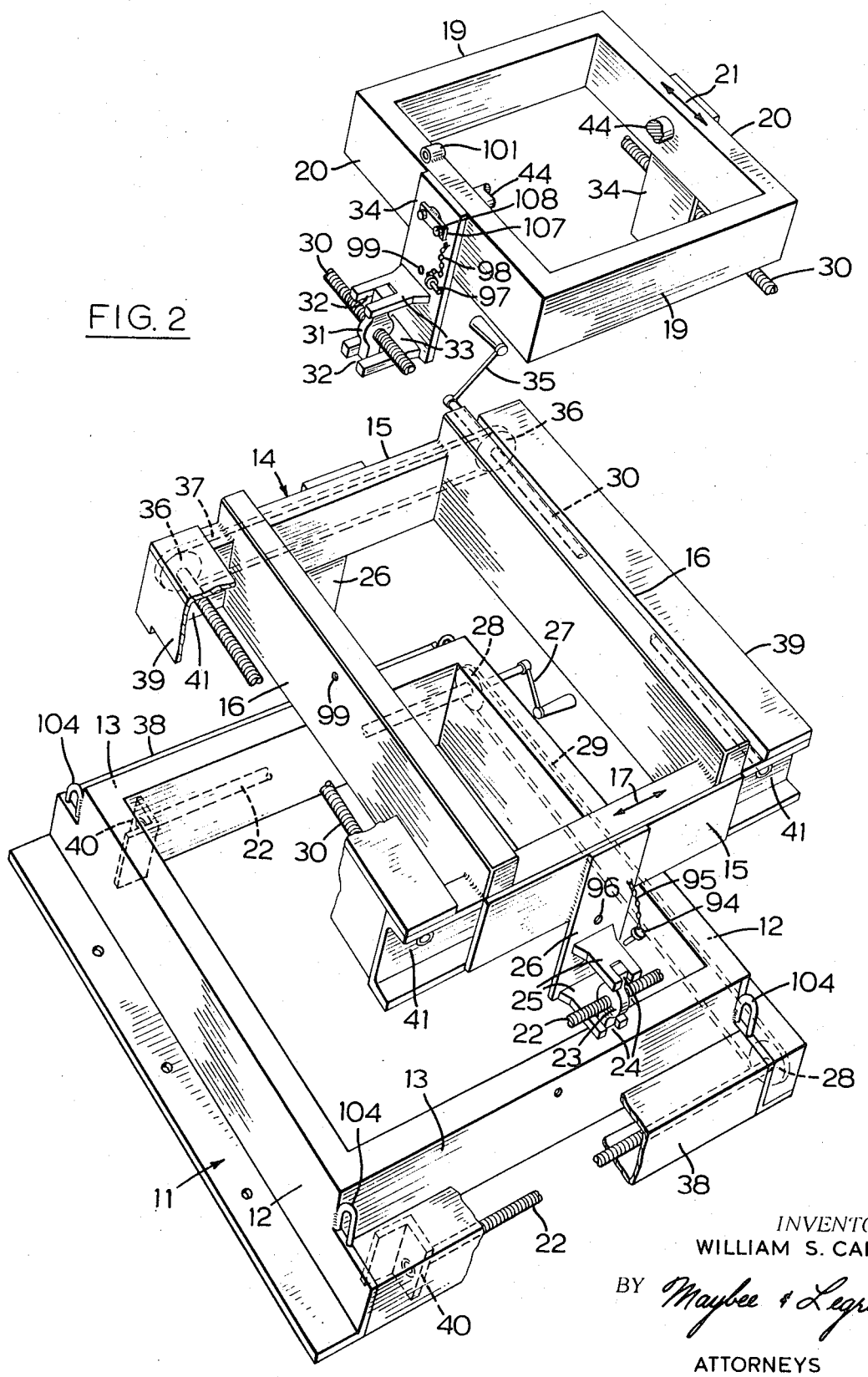
FIG. 2 shows an exploded, perspective view, partially broken away, of a base frame member and two sliding frame members of the device shown in FIG. 1.

The inter-relationship of the frame members 11, 14, 18 and the sliding action and operation of the lower and upper sliding frame members 14, 18 is clearly illustrated by the exploded perspective view of these members shown in FIG. 2, portions of these members being broken away. Referring to FIGS. 1 and 2, the reciprocal sliding of the lower sliding frame member 14 on the base frame member 11 is controlled by a first control mechanism which operates by revolving continuously threaded shafts 22, mounted on the base frame member 11, which engage flanged nuts 23. The flanged nuts 23 in turn engage slotted portions 24 of ourtwardly extending upper and lower wing members 25 which are integrally connected to bracket members 26 with the bracket members 26 being integrally attached to sides 15 of the frame member 14 It is to be noted that only the flanged nut 23 and the wing members 25 on the front of the frame member 14, as shown in FIGS. 1 and 2, are visible, the rear nut and wing members being hidden. Integrally attached to the rear threaded shaft 22 is a crank handle 27 and toothed gears 28 are located on both of the shafts 22 with a driving chain member 29 located on and between the gears 28. It can be seen that rotation of the handle 27 causes rotation of the shafts 22 with the flanged nuts 23 then moving along the shafts 22 in a direction depending on the direction of rotation of the handle 27. The frame member 14 is then seen to be reciprocally slidably moved on the base frame member 11 in the directions of arrows 17.

The reciprocal sliding of the upper sliding frame member 18 on the lower sliding frame member 14 is operated and controlled by a second control mechanism which is the same type as that used for controlling the sliding motion of the frame member 14. Thus, threaded shafts 30, mounted on the frame member 14 engage flanged nuts 31 which in turn engage slotted portions 32 of wing members 33. The wing members 33 (shown only on the left hand side of the frame member 18, those on the right hand side being hidden) are integrally attached to bracket members 34 which are in turn integrally connected to the sides 20 of the frame member 18. A crank handle 35 is attached to the right hand threaded shaft and toothed gears 36 are located on the shaft 30 with a chain member 37 located on and between the gears 36. Turning of the handle in either direction, as desired, moves the flanged nuts 31 along the threaded shafts 30, with the frame member 18 being caused to slidably reciprocally move on the frame member 14 in the directions of the arrows 21.

The threaded shafts 22, 30 are seen to be located in protective housings 38, 39 respectively, which housings are integral with the base frame member 11 and the lower sliding frame member 14, respectively. The ends of the shafts 22, 30 are bushed in extended portions 40, 41 of the frame members 11, 14 respectively. Advantageously, the threaded shafts 22, 30 are the same length and size to eliminate the necessity of stocking two different sizes of rod for replacement purposes.

Although the sliding frame members 14, 18 can be operated by the first and second mechanical control mechanisms, respectively, afore-described, it can be appreciated that the first and second control mechanisms can be motor operated or they can be hydraulically operated mechanisms if desired. Thus, for example, the manually operated handles 27, 35 can be replaced by motors which drive the rotating shafts 22, 30, or the rotating shafts 22, 30, the flanged nuts 23, 31 and the wing members 25, 33 can be replaced by control mechanisms comprising hydraulically operated cylinder-piston arrangements which slidably move the frame members 14, 18 at right angles to each other.

Referring now to FIGS. 1 and 3 of the drawings, a fourth frame member 42 is located and pivotally mounted within the third upper sliding frame member 18 and a supporting table member 43 is supported and pivotally mounted within the fourth frame member 42. The frame member 42 and the table member 43 are mounted to pivot on axes substantially at right angles to each other. The exploded perspective view of the two members 42, 43 in FIG. 3 clearly illustrates the interaction of these two members. Thus, the fourth frame member 42 is pivotally mounted on a pair of aligned axle members 44 which are bushed in opposite sides of the frame 42 and are integrally mounted in the opposite sides 20 of the third frame member 18. The inner supporting table member 43 is pivotally mounted on a pair of aligned axle members 45 which are bushed in opposite sides of the member 43 and are integrally mounted in opposite sides 46 of the fourth frame member 42. The frame member 42 and the table member 43 are thus seen to be mounted to pivot freely on axes located at right angles to each other. Advantageously, the axle members 44, 45 are the same length and size to facilitate replacement thereof.

Figure 5:
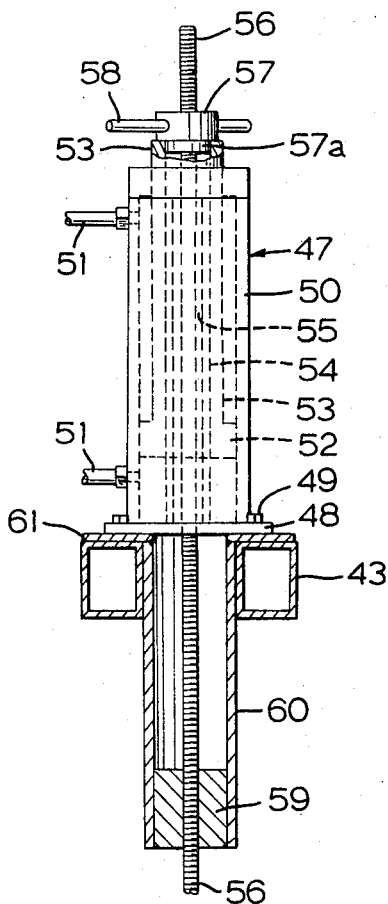
FIG. 5 is an elevational view, partially in section, of an hydraulic pulling device located on the device of FIG. 1.

Referring to FIGS. 1, 3, 4 and 5, an hydraulically operated pulling device 47, which is an hydraulically operated jack in the embodiment shown in the drawings, is mounted on and attached to the table member 43 by way of flange 48 and bolts 49. Referring to FIG. 3, and in particular to FIG. 5, which is an elevational view, partly in section, of the pulling device 47 attached to the table member 43, the pulling device 47 has a cylinder 50 with hydraulic lines 51 attached to the upper and lower ends thereof. The cylinder 50 contains a hollow piston 52 with a hollow piston rod 53 attached to the upper end thereof. The piston 52 and the piston rod 53 are supported by an inner hollow cylindrical member 54 integrally attached to the flange 48 on the cylinder 50. The hollow cylindrical member 54 is seen to provide a cylindrical cavity 55 through the longitudinal centre of the pulling device 47 for receipt of puller rod member 56 which is pulled by the pulling device 47 during testing operations. The piston 52 is properly sealed outwardly and inwardly on the cylinder 50 and the inner cylindrical member 54 respectively by way of piston rings (not shown) and the upper end of the piston rod 53 is provided with packing (not shown) to prevent escape of hydraulic fluid. The rod member 56 contained in the pulling device 47 is threaded at its upper end as shown in FIGS. 1, 4 and 5 and a holding and centering member 57 is provided to hold and center the rod member 56 on top of the piston rod 53 during pulling operations. The holding member 57 is threaded internally and is screwed onto the rod member 56 until it contacts and seats on the upper face of the piston rod 53. The holding member 57 has a smaller portion 57a on the lower end thereof which closely fits into the end of the upper piston rod 53 to centre the rod member 56. Outwardly extending handles 58 are advantageously provided on the holding member 57 to allow easy and rapid adjusting of the same.

The puller rod 56 is fabricated from special high strength steel to withstand the high pulling forces used in testing guy anchors. A special puller rod steel threaded throughout its length and having a yield strength of 140,000 p.s.i. has been found to be very advantageous. At the same time a special steel is used for the holding member 57 which tends to be self lubricating and can be easily and quickly spun on and off the puller rod 56. The table member 43 is prevented from tipping off-centre of the pulling axis by centrally locating the puller rod 56 in a machined bushing 59 integrally attached to the lower end of a hollow cylindrical member 60 extending downwardly and centrally from the table member 43. The cylindrical member 60 is integrally attached to the table member 43 such as by welding it thereto and/or by being bolted thereto such as by integral outwardly extending flange 61, as shown in FIGS. 3 and 5. It is to be noted that the puller rod 56 has a free sliding fit in the bushing 59.

Operation of the pulling device 47 is seen to be carried out by supplying hydraulic fluid under pressure to the cylinder 50 through the lower hydraulic line 51 with an upward force being then exerted on the piston rod 52, 53 and in turn on the holding member 57 and on the rod member 56. At the end of a pulling test pressure is released from lower line 51 thereby allowing the pulling force to drop to zero.

If necessary, pressure can be applied to upper hydraulic line 51 to move the piston 52 downwardly to facilitate uncoupling of the machine from the test.

In the embodiment of the invention shown in the drawings, power means is supplied to the pulling device 47 by hydraulic pressure supplied through the lines 51 by way of hand operated pump mechanism 62 (see FIGS. 1 and 4) to which lines 51 are attached with pressure being supplied by operation of handle 63. A measuring device in the form of gauge 64 is located on the pump mechanism 62 and the gauge 64 is calibrated to indicate the force being exerted on the rod member 56. The power means or pump mechanism 62 is advantageously mounted on a support 65 which is integrally attached to the support for the test rig 10. Rather than be operated by hand as shown, the mechanism 62 can, of course, be operated by a suitably calibrated, mechanically operated pump to supply hydraulic pressure to the cylinder 50.

Figure 6:
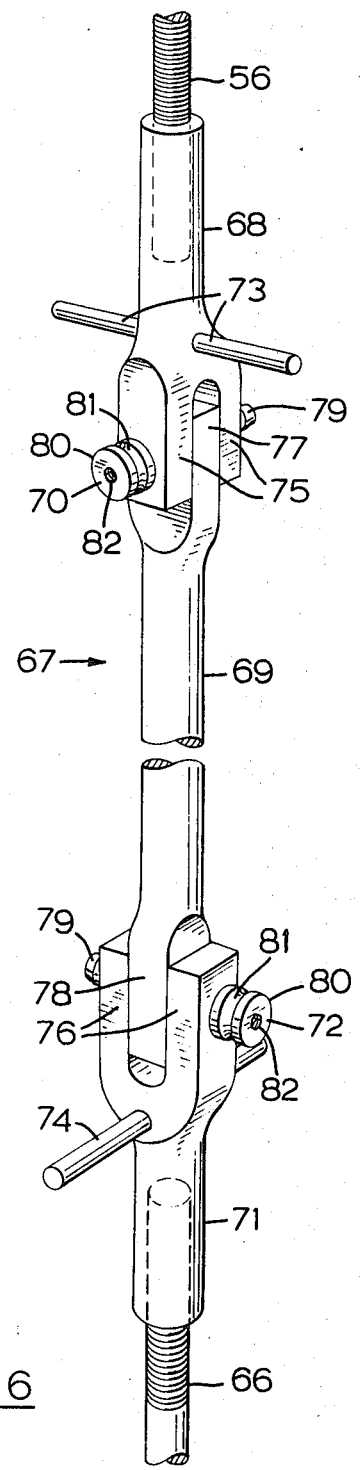
FIG. 6 is a perspective view of an adaptor member used for attachment of the hydraulic pulling device of FIG. 5 to a guy anchor to be tested.

The puller rod 56 must transmit pulling force to the guy anchor to be tested and this is accomplished by using an adaptor member which is connected to the lower end of the puller rod 56 and to a guy anchor 66, as shown in FIG. 4. A useful adaptor member 67 is shown in detail in FIG. 6. Referring to FIGS. 4 and 6, the adaptor member 67 is made in three parts, an upper connector section 68, the upper end of which is internally threaded and is releasably connected to the lower threaded end of the puller rod member 56 by being screwed thereon, a centre section 69 which is releasably pivotally attached at its upper end to the upper connector section 68 by way of pin 70 and a lower connector section 71 which is releasably pivotally attached at its upper end to the lower end of the centre section 69 by way of pin 72. The lower end of the lower connector section 71 is internally threaded and is shown releasably connected to the threaded end of the guy anchor 66 by having been screwed thereon. Upper handle members 73 and lower handle members 74 projecting outwardly from the upper and lower connector sections 68, 71 respectively, are helpful in screwing the connector sections onto the rod member 56 and the guy anchor 66.

It is to be noted that the upper pivotal connection and the lower pivotal connection in the adaptor member 67 are arranged to allow pivotal movement in the lower connection which is at right angles to the pivotal movement in the upper connection. This arrangement in the adaptor member 67 is required to prevent bending or breaking of the rod member 56, the adaptor 67 itself or the guy anchor 66 when a guy anchor is being pulled for testing by the testing device of the invention and the supporting vehicle suddenly slides out of position on the ground where the test is being carried out or the ground gives way under the supporting vehicle. The sudden change of position of the testing device is taken up by the double pivotal arrangement in the adaptor 67 and the double pivotal arrangement of the frame member 42 and the table member 43 without damage to the adaptor, rod member or guy anchor.

In carrying out a pulling test on a guy anchor it is necessary that the guy anchor be aligned with the longitudinal axis of the pulling device 47 and this situation can be ascertained by a special arrangement which is advantageously included in the adaptor member 67. Thus, referring to FIG. 6, the upper and lower connector sections have finely machined flat faces 75, 76 respectively, thereon and the upper and lower ends of the centre section 69 have finely machined flat faces 77, 78 respectively, located between the two faces 75 and the two faces 76 respectively. The finely machined faces 75, 76, 77, 78 are adapted to be aligned when the rod member 56 and the guy anchor 66 are aligned and this alignment of the machined faces is easily observed by eye.

In order to allow the upper and lower connector sections 68, 71 to be easily and quickly connected to the puller rod 56 and the guy anchor 66, respectively, the sections 68, 71 have loose inner threads to allow the connector sections to be quickly spun onto the rod 56 and the anchor 66. The centre section 69 of the adaptor member 67 is advantageously quickly connected to and disconnected from the connector sections 68, 71 by way of the special interchangeable pins 70, 72, shown in detail in FIG. 6. The pins 70, 72 are machined for a slide fit in the centre section 69 and the connector sections 68, 71 with bevelled end portions 79 for easy insertion. A large head 80 is provided on the pins 70, 72 with a circumferential groove 81 therein to allow easy grasping, particularly with gloved hands. A threaded hole 82 is advantageously provided in the head 80 to allow the pin to be pulled out by force, if necessary, or to allow the attachment of retaining chains to prevent loss of pins.

As aforementioned, the testing device is easily portable and maneuverable in difficult terrain and to this end it is mounted on a heavy base member 83 (see FIGS. 1 and 4) which is in turn attached to a vehicle, such as a large crawler tractor, which is capable of travelling on most types of terrain. Any suitable supporting vehicle can be used, however, depending on the terrain and mobility required. In FIG. 4 the test rig 10 attached to the base 83 is shown located on the rear end of a crawler tractor, a portion of tracks 84 of which are shown in broken outline. The base member 83 shown in FIGS. 1 and 4 is composed of heavy I-beams 85 attached to the supporting vehicle and wedge-shaped members 86 attached to the I-beams 85 by means of bolts 87. The base frame member 11 of the testing device 10 is shown attached by way of flange portions 88 thereon to the wedge-shaped members 86 by means of bolts 89. The wedge-shaped members 86 are used to locate the testing device 10 at an angle for testing guy anchors which are anchored in a position inclined to the vertical. The members 86 can, of course, be made to any desired angle and advantageously the members 86 are installed to be easily removable, as shown, by merely removing bolts 87 and 89. In such case the spacing of the holes for bolts 87 on the beams 85 and members 86 and for bolts 89 on the members 86 and the base member 11 are the same to allow the members 86 to be removed and the testing device 10 to be bolted directly to the beams 85 and thereby to be located substantially perpendicularly on the support vehicle for the testing of vertically anchored guy anchors.

In FIG. 1 outrigger legs 90, adjustable as to height, are shown attached to the rear ends of the I-beams 85 by bracket members 91. The lower ends of the legs 90 seat in socket portions 92 of support stands 93, only one of which is shown in FIG. 1. Use of the outrigger legs is most helpful in areas where the testing device and support vehicle are located on soft ground in order to provide further support and prevent serious collapse of ground on which the test is taking place.

Hydraulically operated outrigger legs can, of course, be provided on the support vehicle, if desired. In the arrangement shown in FIG. 4 the guy anchor 66 being tested enters the ground at a point 94 located ahead of the rear point of contact 95 of the supporting vehicle tracks 84 with the ground. With this advantageous arrangement the pulling force at the ground is located in front of the rear contact with the ground of the tracks 84 and thus there is usually no need for outrigger support.

Several safety devices are advantageously included on the guy anchor testing device. Thus, referring to FIGS. 1 and 2, a locking pin 94, attached to chain 95, is provided for inserting in mating holes 96 located in the front bracket member 26 on the lower sliding frame member 14 and in the base frame member 11 to prevent movement of the sliding member 14 during transport of the testing device from one location to another. A locking pin 97, attached to chain 98, is also provided for inserting in mating holes 99 located in the left hand bracket member 34 on the upper sliding frame member 18 and in the sliding frame member 14 to prevent movement of the sliding member 18. Furthermore, referring to FIG. 1, a locking pin 100 is provided for insertion through collar members 101, 102, 103 located on and integral with the upper sliding frame member 18, the fourth, pivotally mounted frame member 42 and the pivotally mounted table member 43 respectively. Location of the pin 100 in the collar members 101, 102, 103 prevents motion of and damage to the pivotally mounted members 42, 43 and the pulling device 47 during transit. The collar member 101 on the sliding member 18 is also shown in FIGS. 2 and 4 and collar members 102, 103 are shown in FIG. 3 on pivotally mounted members 42, 43 respectively. Metal loop members 104 integrally attached to the base frame member 11 (see FIGS. 1, 2 and 4) are used to facilitate grasping and lifting of the testing device. In order to prevent the table member 43 from tilting too far during testing operations a stop member 105 (see FIGS. 1 and 3) is integrally located thereon which bears against the frame member 42, thereby limiting the tilt of the table member 43 in either direction. Stop members 106 are also advantageously located on opposite sides of the frame member 42 and these stop members 106 bear against the frame member 18 upon tilting of the frame member 42 in either direction to limit such tilting.

As aforementioned, the axle members 44, 45 on which the frame member 42 and the table member 43 are pivotally mounted, respectively, are of the same size to facilitate replacement thereof and such replacement is further facilitated by easy removal from and placement in the apparatus. Thus, referring to FIGS. 1 and 2, the axle members 44 are rotatably bushed in the frame member 42 and are slidably located in the frame member 18 while being integrally attached thereto by way of plates 107 (only one plate 107 being visible) welded to the outer ends of the axle members 44 with the plates being bolted to the brackets 34 and the frame 18 by means of bolts 108. The axle members 44 can be quickly and easily removed by removing the bolts 108 and then pulling out the axle members 44 by pulling outwardly on the plates 107. Referring to FIGS. 1 and 3, axle members 45 are located in the frame 42 and the table member 43 in a similar manner, being rotatably bushed in the table member 43 and slidably located in the frame member 42 but integrally attached thereto by way of plates 109 (only one being visible in the drawing) which are welded to the outer ends of the axle members 45 and are bolted to the frame member 42 by means of bolts 110. The axle members 45 are quickly removed by removing the bolts 110 and sliding the axles 45 out by pulling outwardly on the plates 109.

Operation of the device of the invention in testing guy anchors proceeds quickly and efficiently. Thus, referring to FIG. 4, the vehicle carrying the test rig 10 is moved over the guy anchor 66 to be tested with the pulling device 47 axially aligned by eye with the centre line of the anchor 66. The adaptor member 67 is connected between the guy anchor 66 and the rod member 56, using a centre section 69 on the adaptor 67 of required length. The upper and lower connector sections 68, 71 are first screwed onto the rod member 56 and the guy anchor 66 respectively, and the centre section 69 is then pinned into place. Advantageously, the upper connector section 68 is left on the rod member 56 during continuous testing operations. Exact alignment of the rod member 56 and the guy anchor 66 is then accomplished by adjusting the sliding frame members 14, 18 by way of crank handles 27, 35 (see FIG. 2) aforedescribed. Alignment is attained when machines faces 75, 77 and 76, 78 on the adaptor member 67 are aligned as previously described with reference to FIG. 6. It is to be noted that proper angulation of the rod member 56 with the anchor rod 66 (which is inclined at an acute angle to the ground in FIG. 4) is automatically taken care of by the pivotally mounted members 42, 43 carrying the pulling device 47 and by the adaptor 67. As afore-noted, during testing operations the upper connector section 68 is left connected to the rod member 56 when moving from test to test, for the sake of convenience.

Once the rod member 56 has been connected to and properly aligned with the guy anchor 66 and the outrigger legs 90 (see FIG. 1) have been placed in supporting position, if necessary, the holding member 57 which is usually left on the rod member 56 is screwed down the rod member 56, as required, onto the upper piston rod 53 and hydraulic power is supplied to the lower end of the cylinder 50 by operating the power means 62. Pressure is exerted upwardly on the holding member 57, and the rod member 56 and the anchor rod 66 are subjected to an upward pulling force which pulling force can be read directly on the calibrated measuring gauge 64. After a test has been completed hydraulic pressure is released from the pulling device 47, the adaptor member 67 is removed from the anchor rod tested and the test rig is then free to move to another test site.

It is to be noted that in any one test the distance between the pulling device 47 and the anchor rod being tested will vary and to allow for this different lengths of the centre sections 69 for the adaptor member 67 are kept readily available. At the same time, rod member 56 can be moved upwardly or downwardly, as required, in the pulling device 47, before connection to the anchor rod 66, by merely spinning the holding member 57 downwardly or upwardly on the rod member 56 to properly position the same. It is also to be noted that any shifting of the supporting vehicle resulting in a shifting in position of the test rig 10 is normally compensated for by the pivoting of members 42, 43 and by the pivotal connections in the adaptor 67. Realignment of the puller rod member 56 and the anchor rod being tested is easily taken care of by repositioning of the sliding frame members 14, 18. Thus, a test can be normally carried out quickly and efficiently without having to completely rearrange the supporting vehicle which would mean disconnecting the test rig from the anchor rod being tested and completely repeating the test.

Although the guy anchor testing device of the invention has been described with reference to tests involving upwardly directed pulling forces, the apparatus can, of course, be arranged to carry out horizontally or downwardly directed pulling forces. Furthermore, the apparatus can also be utilized for carrying out compression tests in which pushing forces are brought to bear on guy anchors to be tested.

In certain testing operations involving travelling over and testing on very marshy areas or on soft muskeg it has been found advantageous to use a much lighter and more portable test rig which can be carried into the testing area by hand, if necessary, and assembled on the site without the use of a heavy mounting vehicle. In this lighter, portable test rig only a first base frame member and a second sliding frame member slidably mounted on the first frame member are utilized, with the third sliding frame member and pivotally mounted fourth frame member being eliminated. The hydraulically-operated pulling device is mounted on a table member but the table member is slidably mounted on the second frame member and moves substantially at right angles to the movement of the second frame member. The same hydraulically-operated pulling device is used with a puller rod member centrally located therein.

Preferably, the same adaptor member as previously described is connected to the lower end of the puller rod member and is attached to a guy anchor to be tested, as also previously described. The first base frame member and the second sliding frame member are advantageously constructed from easily assembled light metal sections with the base frame member being mounted on large skid members to provide as large a contact area on the ground as practically possible.

It can be seen that the testing device of the invention is easily, efficiently and quickly operable and combines ruggedness and the ability to exert the high pulling forces necessary for large guy anchor installations with excellent mobility and maneuverability. Testing of guy anchors by increased incremental loading is easily and smoothly carried out and test loading of up to 100,000 pounds has been successfully carried out by the present novel testing device.

I claim:

1. A testing device for guy anchors comprising a first base frame member, a second lower sliding frame member slidably mounted and superposed on the first frame member, a third upper sliding frame member slidably mounted and superposed on the second frame member, a first control mechanism on the first frame member connected to and slidably moving the second frame member, a second control mechanism on the second frame member connected to and slidably moving the third frame member substantially at right angles to the movement of the second frame member, a fourth frame member located and pivotally mounted within the third frame member, a supporting table member located and pivotally mounted within the fourth frame member, the fourth frame member and the supporting table member being mounted to pivot on axes substantially at right angles to each other, a pulling device mounted on the table member, the pulling device comprising an hydraulically-operated jack having a cylinder and piston and an upper piston rod on said piston, said piston and piston rod being hollow through the longitudinal centre thereof and containing a rod member to be pulled and having an upper holding and centering member and a lower centering member thereon to hold and centre said rod member in said pulling device, said piston and upper piston rod operating upwardly against the upper holding and centering member to provide pulling force on said rod member, an adaptor member connected to the lower end of the rod member, said adaptor member having an upper connector section releasably connected to the rod member, a centre section having an upper and lower end and a lower connector section releasably connectible to a guy anchor to be tested, said centre section being releasably pivotally attached at its upper end to the upper connector section and being releasably pivotally attached at its lower end to the lower connector section, said pivotal attachments being arranged to allow pivotal movement in the lower attachment at right angles to that in the upper attachment, and a power means attached to said pulling device to supply power thereto, said power means having a measuring device thereon calibrated to indicate pulling force being exerted on said rod member.

2. A testing device as claimed in claim 1 wherein the upper holding member comprises a nut which is screwed onto said rod member and downwardly onto said upper piston rod to hold said rod member, said nut having a lower smaller portion thereon closely fitting into said upper piston rod to centre said rod member, and the lower centering member comprises a hollow, cylindrical member extending downwardly and centrally from the table member and a bushing integral with the lower end of said cylindrical member, said bushing having a hole through the centre thereof providing a sliding fit for said rod member.

3. A testing device as claimed in claim 1 or 2 wherein the second and third frame members slide on top of the first and second frame member, respectively, each guided and driven by a separate pair of threaded shaft members, one pair located along parallel sides of the first frame member and the other pair located along parallel sides of the second frame member, said shaft members having nuts thereon which engage brackets attached to parallel sides of the second and third frame members, respectively.

4. A testing device as claimed in claim 1 or 2 wherein the fourth frame member and the table member are each pivotally mounted by way of a pair of axle members attached to opposite sides of the third frame member and the fourth frame member, respectively, each pair of axle members being pivotally bushed in opposite sides of the fourth frame member and the table member, respectively.

5. A testing device as claimed in claim 1 or 2 wherein a wedge-shaped, removable mounting base member is attached to the bottom of the first frame member to mount the testing device at an angle in order to test guy anchors anchored in a position inclined to the vertical.

6. A testing device as claimed in claim 1 or 2 wherein the upper and lower pivotal attachments in the adaptor members have finely machined faces thereon which are aligned when the rod member and guy anchor to be tested are connected to the adaptor member and are longitudinally aligned.

References Cited

UNITED STATES PATENTS

| | | | |
|---|---|---|---|
| 2,096,964 | 10/1937 | Frocht | 73—88 |
| 2,780,068 | 2/1957 | Grimes | 73—95 |
| 2,835,128 | 5/1958 | Herrstrum | 73—141 |

JAMES J. GILL, Primary Examiner

HERBERT GOLDSTEIN, Assistant Examiner

U.S. Cl. X.R.

73—141; 254—29